(12) United States Patent
Duncan et al.

(10) Patent No.: US 8,871,116 B2
(45) Date of Patent: Oct. 28, 2014

(54) HYDROCHLORIC ACID WASHING OF CARBON AND GRAPHITE FOR MAKING CONDUCTIVE INK FOR ULTRACAPACITORS

(75) Inventors: Renee Kelly Duncan, Corning, NY (US); Kishor Purushottam Gadkaree, Painted Post, NY (US); Felipe Miguel Joos, Painted Post, NY (US); Charles Warren Lander, Wayland, NY (US)

(73) Assignee: Corning Incorporated, Corning, NY (US)

( * ) Notice: Subject to any disclaimer, the term of this patent is extended or adjusted under 35 U.S.C. 154(b) by 587 days.

(21) Appl. No.: 13/250,087

(22) Filed: Sep. 30, 2011

(65) Prior Publication Data

US 2013/0082213 A1    Apr. 4, 2013

(51) Int. Cl.
| | |
|---|---|
| *H01B 1/04* | (2006.01) |
| *H01B 1/06* | (2006.01) |
| *C09D 11/52* | (2014.01) |
| *C09D 11/037* | (2014.01) |

(52) U.S. Cl.
CPC .............. *C09D 11/52* (2013.01); *C09D 11/037* (2013.01)
USPC ............................ 252/502; 252/503; 252/511

(58) Field of Classification Search
None
See application file for complete search history.

(56) References Cited

U.S. PATENT DOCUMENTS

| | | | | |
|---|---|---|---|---|
| 4,035,265 | A | 7/1977 | Saunders | |
| 5,098,771 | A | 3/1992 | Friend | 428/209 |
| 5,286,415 | A | 2/1994 | Buckley et al. | 252/502 |
| 5,679,138 | A | 10/1997 | Bishop et al. | 106/20 |
| 5,855,820 | A * | 1/1999 | Chan et al. | 252/511 |
| 5,953,204 | A * | 9/1999 | Suhara et al. | 361/502 |
| 7,486,497 | B2 | 2/2009 | Kobayashi et al. | 361/502 |
| 7,852,613 | B2 | 12/2010 | Ma et al. | 361/503 |
| 2004/0120100 | A1 * | 6/2004 | Reynolds, III | 361/508 |
| 2010/0110613 | A1 | 5/2010 | Zhong et al. | 361/502 |
| 2010/0238606 | A1 * | 9/2010 | Dreissig et al. | 361/502 |
| 2011/0180762 | A1 * | 7/2011 | Sasaki et al. | 252/511 |
| 2011/0311431 | A1 * | 12/2011 | Ka et al. | 423/448 |

FOREIGN PATENT DOCUMENTS

CN    1456609    11/2003

OTHER PUBLICATIONS

Pandolfo, et al., "Carbon Properties and Their Role in Supercapacitors", Journal of Power Sources, 157, (2006), pp. 11-27.
Kotz, et al., "Principles and Applications of Electrochemical Capacitors," Electrochimica Acta, (2000), pp. 2483-2498.
Haaf, et al., "Polymers of N—Vinylpyrrolidone: Synthesis, Characterization and Users," Polymer Journal, vol. 17, No. 1., (1985), pp. 143-152.
Andrieu, Xavier, "Ultracapacitors for Portable Electronics", Energy Storage Systems Electron: New Trends, Electrochem. Technology, (2000), p. 521-547.
PCT/US2012/057679 Search Report.

* cited by examiner

*Primary Examiner* — Harold Pyon
*Assistant Examiner* — Jaison Thomas
(74) *Attorney, Agent, or Firm* — Michael Russell

(57) ABSTRACT

Water-based conductive ink compositions may include acid-washed graphite particles, carbon black particles, at least one polymeric dispersant, at least one acrylic binder, at least one polyvinylpyrrolidone binder, at least one defoamer, and an aqueous carrier. At least 90 wt. % of the acid-washed graphite particles and the carbon black particles, based on the combined weight of the acid-washed graphite particles and the carbon black particles, may have particle sizes less than 10 μm. The water-based conductive ink composition may have a total elemental contaminant level of less than 100 ppm, based on the total weight of the water-based conductive ink composition. Methods for preparing the water-based conductive ink compositions may include preparing a letdown phase from a first premix containing carbon black and a second premix containing acid-washed graphite. The methods may include washing graphite particles in an strong acid such as hydrochloric acid, nitric acid, sulfuric acid, or mixtures thereof.

21 Claims, No Drawings

HYDROCHLORIC ACID WASHING OF CARBON AND GRAPHITE FOR MAKING CONDUCTIVE INK FOR ULTRACAPACITORS

BACKGROUND

1. Field

The present specification generally relates to conductive inks and preparation methods and, in particular, to water-based conductive inks and preparation methods in which elemental contaminants in the conductive inks are present at less than 100 parts per million (ppm).

2. Technical Background

Polymer-based electrically conductive composites such as conductive ink coatings are used for electronic devices such as ultracapacitors. The ink coatings are usually comprised of conductive materials such as expensive carbon fibrils (carbon filaments) that have high surface area and conductance, binders that provide adhesion to a substrate and cohesion between structures, and other additives such as thickeners, conductivity enhancing agents, anti-kogation agents, drying agents and defoamers. A notable limitation in the use of conductive particles in conductive inks, particularly for devices such as ultracapacitors, is faradic reactions. Faradic reactions occur as a result of charge transfer at the surface of an electrode as a result of electrochemical reaction.

There remain ongoing needs for conductive ink compositions and preparation methods that reduce or eliminate faradic reactions in devices in which the conductive ink compositions are used.

SUMMARY

Embodiments of water-based conductive ink compositions described herein may include as ingredients an aqueous carrier, acid-washed graphite particles, carbon black particles, and at least one stabilizing ingredient that suspends the acid-washed graphite particles and the carbon black particles in the aqueous carrier. The at least one stabilizing ingredient being selected from the group consisting of dispersants, binders, defoamers, and combinations thereof. The water-based conductive ink compositions may have a total elemental contaminant level of less than 100 ppm, based on the total weight of the water-based conductive ink composition. The total elemental contaminant level is the total concentration of aluminum, calcium, cobalt, chromium, copper, iron, potassium, manganese, magnesium, nickel, and zinc in the water-based conductive ink composition. In some embodiments, at least 90 wt. % of the acid-washed graphite particles and the carbon black particles, based on the combined weight of the acid-washed graphite particles and the carbon black particles, have particle sizes less than 10 μm.

Embodiments of methods for preparing the water-based conductive ink compositions may include adding to a first vessel carbon black particles, at least one polymeric dispersant, at least one acrylic binder, at least one polyvinylpyrrolidone binder, at least one defoamer, and water to form a carbon-black grind phase. The carbon-black grind phase may be ground to reduce particle sizes. In some embodiments the carbon-black grind phase may be ground until at least 90% of the carbon black particles have a particle size less than 10 μm. To a second vessel may be added acid-washed graphite particles, at least one polymeric dispersant, and water, to form a graphite grind phase. The graphite grind phase may be ground to reduce particle sizes. In some embodiments the graphite grind phase may be ground until at least 90% of the graphite particles have a particle size less than 10 μm. Thereupon, at least a portion of the carbon-black grind phase and at least a portion of the graphite grind phase may be mixed in a third vessel to form the conductive ink composition. The water-based conductive ink compositions prepared by these methods may have a total elemental contaminant level of less than 100 ppm by weight, based on the total weight of the water-based conductive ink composition. The total elemental contaminant level is the total concentration of aluminum, calcium, cobalt, chromium, copper, iron, potassium, manganese, magnesium, nickel, and zinc in the water-based conductive ink composition.

DETAILED DESCRIPTION

Reference will now be made in detail to embodiments of water-based conductive ink compositions and preparation methods thereof. It is believed that unwanted faradic reactions in electrical devices incorporating the conductive ink compositions may result from elemental contaminants introduced from as-received components within the preparation of the ink coatings. In an ultracapacitor cell, for example, faradic reactions may lower capacitance and increase the equivalent series resistance. Without intent to be bound by theory it is believed that processing steps such as ball milling with iron balls, typically involved in reducing particle sizes of graphite and carbon black to a customer's specifications, may be a source of the elemental contaminants in as-received graphite and carbon black. As-received components that may introduce the elemental contaminants to conductive ink compositions may include not only conductors such as graphite and carbon black, but also ingredients such as binders and dispersants. As such, water-based conductive ink compositions according to embodiments herein are formulated with conductive particles that are washed to minimize or remove elemental contaminants and with a minimal number of additional ingredients so as to reduce the number of elemental contaminants introduced through the additional ingredients.

According to various embodiments, water-based conductive ink compositions may contain an aqueous carrier, acid-washed graphite particles, carbon black particles, and at least one stabilizing ingredient that suspends the acid-washed graphite particles and the carbon black particles in the aqueous carrier. In illustrative embodiments, the at least one stabilizing ingredient may be selected from dispersants such as polymeric dispersants, binders such as acrylic binders and/or polyvinylpyrrolidone binders, defoamers, and combinations thereof. In preferred embodiments, the water-based conductive ink compositions may have a total elemental contaminant level of less than 100 ppm, less than 50 ppm, less than 20 ppm, or even less than 10 ppm, based on the total weight of the water-based conductive ink composition. In further embodiments, the water-based conductive ink compositions may have iron concentrations of less than 50 ppm, less than 30 ppm, less than 10 ppm, or less than 5 ppm. The total elemental contaminant level, as defined herein, is the total concentration of aluminum, calcium, cobalt, chromium, copper, iron, potassium, manganese, magnesium, nickel, and zinc in the water-based conductive ink composition, as determined by inductively coupled plasma mass spectrometric analysis (ICP-MS analysis). The iron concentration, as used herein, is the total concentration of iron determined by ICP-MS analysis. In some embodiments, at least 90 wt. % of the acid-washed graphite particles and the carbon black particles, based on the combined weight of the acid-washed graphite particles and the carbon black particles, may have particle sizes of less than 10 μm.

The water-based conductive ink compositions may comprise an aqueous carrier. In some non-limiting embodiments the aqueous carrier consists essentially of or consists of water. As used herein, the term "the aqueous carrier consists essentially of water" means that the aqueous carrier is water that may contain trace amounts (for example, less than 500 ppm, less than 100 ppm, or less than 50 ppm by weight) of elemental impurities but does not contain any additional intentionally added water-soluble materials. It should be understood that aqueous carriers that consist essentially of or consist of water are generally the most environmentally-friendly carriers for inks, both for preparation, use, and disposal. In illustrative embodiments, the water-based conductive ink compositions may comprise from about 75 wt. % to about 97.5 wt. % of the aqueous carrier. In further embodiments, the water-based conductive ink compositions may consist of the aqueous carrier; the acid-washed graphite particles; the carbon black particles; and the at least one stabilizing ingredient selected from at least one polymeric dispersant, at least one acrylic binder, at least one polyvinylpyrrolidone binder, at least one defoamer, and combinations thereof. In such embodiments, the aqueous carrier represents a balance of the water-based conductive ink composition up to 100 wt. % when all the above-listed ingredients are taken into account.

The acid-washed graphite particles in the water-based conductive ink compositions may be graphite particles, derived from any suitable source, that have been washed in any suitable acid to remove or reduce from the graphite particles any elemental contaminants present therein. In general, graphite is a crystalline and stable form of elemental carbon typically formed by heat-treatment of non-graphitic carbon at temperatures in excess of 2500° C. It may be preferably that the graphite particles, prior to washing, be dry particles not contained in any dispersion medium or emulsion medium, to avoid introduction of additional elemental contaminants from the dispersion medium or emulsion medium itself. Suitable acids for washing the graphite may include, for example, hydrochloric acid, nitric acid, sulfuric acid, and mixtures thereof. Methods for washing the graphite particles are described in greater detail below. In illustrative embodiments, the water-based conductive ink composition may contain from about 0.03 wt. % to about 1.0 wt. %, or from about 0.1 wt. % to about 0.5 wt. % of the acid-washed graphite particles.

The carbon black particles in the water-based conductive ink compositions may derived from any suitable source. In general, carbon black is an isotropic and conductive filler that is formed from the incomplete combustion of hydrocarbons such as petroleum. Optionally, the carbon black particles in the water-based conductive ink composition may be acid-washed also. In illustrative embodiments, the water-based conductive ink composition may contain from about 0.4 wt. % to about 6 wt. %, or from about 2 wt. % to about 5 wt. % of the carbon black particles.

In some embodiments, at least 90 wt. % of the acid-washed graphite particles and the carbon black particles, based on the combined weight of the acid-washed graphite particles and the carbon black particles in the water-based conductive ink compositions, may have particle sizes of less than 10 μm. In further embodiments, at least 90 wt. % of the acid-washed graphite particles and the carbon black particles may have particle sizes of less than 10 μm and at least 50 wt % of the acid-washed graphite particles and the carbon black particles may have particle sizes of less than 5 μm. In still further embodiments, at least 90 wt. % of the acid-washed graphite particles and the carbon black particles may have particle sizes of less than 10 μm, at least 50 wt % of the acid-washed graphite particles and the carbon black particles may have particle sizes of less than 5 μm, and at least 10% of the acid-washed graphite particles and the carbon black particles may have particle sizes of less than 1 μm.

The water-based conductive ink compositions may further include at least one stabilizing ingredient that suspends the acid-washed graphite particles and the carbon black particles in the aqueous carrier. The at least one stabilizing ingredient may be selected from dispersants, binders, defoamers, and combinations thereof, for example. It may be preferable that each individual stabilizing ingredient have a low elemental contaminant level such as less than 50 ppm, defined as above, to avoid introducing elemental contaminants into the final water-based conductive ink composition. In some embodiments, the amounts of the at least one stabilizing ingredient are sufficient to retain the acid-washed graphite particles and the carbon black particles in a state of homogeneous mixing and suspension in the water-based conductive ink composition for at least two weeks. In such embodiments, the overall viscosity of the water-based conductive composition and the interactions among the ingredients of the water-based conductive composition are tailored to prevent settling out of the graphite particles and the carbon black particles over a long period of time. It may be preferable that the water-based conductive ink compositions have viscosities ranging from about 3 cps at $100\ s^{-1}$ to about 10 cps at $100\ s^{-1}$, as these viscosities may be amenable to application of the water-based conductive ink compositions by processes such as slot coating. It may further be preferable that the water-based conductive ink compositions exhibit low levels of shear-thinning. Without intent to be bound by theory, it is believed that low levels of shear thinning may be indicative of a composition that can remain stable and usable over a long period of time, thereby decreasing or eliminating an inconvenience and cost associated with reformulating inks that settle quickly. For example, it may be preferable that the same water-based conductive ink compositions with viscosities ranging from about 3 cps to about 10 cps at a shear rate of $100\ s^{-1}$ also have viscosities from about 5 cps to about 25 cps at a shear rate of $1\ s^{-1}$.

When present as a stabilizing ingredient, the dispersant may be selected from any dispersant suitable for formulating printable or coatable inks. In illustrative embodiments, the dispersant may include at least one polymeric dispersant that is suitable for preventing settling of carbon black and graphite in the water-based conductive ink compositions. The at least one polymeric dispersant may comprise one or more surfactants, for example. Polymeric dispersants devoid of anionic polyelectrolytes are particularly suitable. One specific, suitable non-limiting polymeric dispersant is Solsperse® 46000, available from Lubrizol as a 50% aqueous solution. In illustrative embodiments, the water-based conductive ink composition may contain a total of from about 0.02 wt. % to about 0.45 wt. %, or from about 0.05 wt. % to about 0.3 wt. % of the at least one polymeric dispersant.

When present as a stabilizing ingredient, the binder may be selected from any binder suitable for formulating printable or coatable inks. In illustrative embodiments, the water-based conductive ink composition may include, without limitation, at least one acrylic binder, at least one polyvinylpyrrolidone binder, or at least one of each.

When present in the water-based conductive ink composition, the at least one acrylic binder may be any acrylic binder that aids the adhesion of conductive particles such as the graphite and the carbon black to a substrate such as a circuit board or a component of an ultracapacitor, for example. In general, acrylic emulsions may be film-forming rheology controlled acrylic emulsions that contain various ammonia salts of modified styrene acrylic polymers, water, and unreacted ammonium hydroxide. Particularly suitable acrylic binders for use herein include, but are not limited to, Joncryl® products from BASF such as Joncryl® 624 and Joncryl® 2660. In illustrative embodiments, the water-based conductive ink composition may contain a total of from about 1.04 wt. % to about 8.0 wt. %, or from about 1.5 wt. % to about 5 wt. % acrylic binder, based on one acrylic binder or a plurality of acrylic binders.

When present in the water-based conductive ink composition, the at least one polyvinylpyrrolidone binder may be any polyvinylpyrrolidone binder suitable for maintaining cohesion among the conductive particles such as the graphite and the carbon black within the water-based conductive ink composition itself. Polyvinylpyrrolidones are water-soluble polymers made from the monomer N-vinylpyrrolidone. In solution, polyvinylpyrrolidones have excellent wetting properties. In one embodiment, the polyvinylpyrrolidone binders may contain polyvinylpyrrolidones having average molecular weights of from about 40,000 Da to about $1.5 \times 10^6$ Da. In another embodiment, the at least one polyvinylpyrrolidone binder may comprise first polyvinylpyrrolidones with average molecular weights of from 40,000 Da to 80,000 Da and second polyvinylpyrrolidones with average molecular weights of from $1.0 \times 10^6$ Da to $1.5 \times 10^6$ Da. Particularly suitable polyvinylpyrrolidone binders for use herein include, but are not limited to, Luvitec® PVP K30 and Luvitec® PVP K90, both available from International Specialty products and containing polyvinylpyrrolidones with molecular weights of 60,000 Da and $1.2 \times 10^6$ Da, respectively. In illustrative embodiments, the water-based conductive ink composition may contain a total of from about 1.04 wt. % to about 8.0 wt. %, or from about 1.5 wt. % to about 5 wt. % polyvinylpyrrolidone binder, based on one polyvinylpyrrolidone binder or a plurality of polyvinylpyrrolidone binders.

When present in the water-based conductive ink composition, the at least one defoamer may be any suitable additive that prevents foaming of water-based conductive ink compositions. At least one defoamer may be a preferred component particularly when the water-based conductive ink composition contains a polymeric dispersant that is a surfactant or has foaming tendencies. In one embodiment, a suitable defoamer is 1-butanol. In illustrative embodiments, the water-based conductive ink composition may contain a total of from about 0.04 wt. % to about 1.5 wt. % defoamers, based on one defoamer or a plurality of defoamers.

In further embodiments, the water-based conductive ink compositions are devoid of organic solvents and water-soluble organic co-solvents such as alcohols, ketones, ethers, esters, and polyhydric alcohols, for example. It may be preferred that the water-based conductive ink compositions be devoid of alkylene glycols such as ethylene glycol, diethylene glycol, and propylene glycol. Further examples of water-soluble organic polymers that may be excluded from the water-based conductive ink compositions described herein include, for example, polyacrylic acids, polymaleic acids, polyacrylamides, polyvinyl alcohols, polyethyloxyazolines, and polyglycols. It is also preferred that all components of the water-based conductive ink composition are chemically compatible with acetonitrile. Acetonitrile is commonly used as an electrolyte in ultracapcitors. As such, chemical compatibility with acetonitrile may ensure that the water-based conductive ink compositions may be suitable for depositing conductor layers for ultracapacitors.

An illustrative embodiment of water-based conductive ink compositions, based on several of the embodiments described above, may include from about 0.03 wt. % to about 1.0 wt. % acid-washed graphite particles; from about 0.40 wt. % to about 6.0 wt. % of the carbon black particles; from about 0.02 wt. % to about 0.45 wt. % polymeric dispersant; from about 1.0 wt. % to about 8.0 wt. % acrylic binder; from about 1.0 wt. % to about 8.0 wt. % polyvinylpyrrolidone binder; from about 0.04 wt. % to about 1.5 wt. % defoamer; and from about 75.05 wt. % to about 97.43 wt. % of the aqueous carrier, based on the total weight of the water-based conductive ink composition. Such water-based conductive ink compositions may be devoid of organic solvents, water-soluble organic co-solvents, and alkylene glycols. The total elemental contaminant level of such water-based conductive ink compositions may be less than 100 ppm, based on the total weight of the composition.

Various embodiments of water-based conductive ink compositions have been described above. In further embodiments, methods of preparing or formulating the water-based conductive ink compositions now will be described. The methods for preparing the water-based conductive ink compositions may include preparing as a first premix a carbon-black grind phase, preparing as a second premix a graphite grind phase, and mixing the first premix and the second premix to form the water-based conductive ink composition.

Preparing the first premix may include adding ingredients to a first vessel to form a carbon-black grind phase therein. The ingredients may include carbon black particles, at least one polymeric dispersant, at least one acrylic binder, at least one polyvinylpyrrolidone binder, at least one defoamer, and water. In some embodiments, the carbon-black grind phase may contain from 1 wt. % to 10 wt. % carbon black and from 77 wt. % to 98.65 wt. % water. The relative amounts of the other ingredients may be varied as desired. In an illustrative embodiment, the carbon-black grind phase may contain less than 1 wt. % total polymeric dispersant, less than 2 wt. % total acrylic binder, less than 2 wt. % total polyvinylpyrrolidone binder, and less than 2 wt. % total defoamer. In a further illustrative embodiment, the carbon-black grind phase may contain from about 1 wt. % to about 10 wt. % of the carbon black particles; from about 0.05 wt. % to about 0.5 wt. % total polymeric dispersant; from about 0.1 wt. % to about 5 wt. % acrylic binder; from about 0.1 wt. % to about 5 wt. % polyvinylpyrrolidone binder; from about 0.1 wt. % to about 2.5 wt. % defoamer; and from about 77 wt. % to about 98.65 wt. % water based on the total weight of the carbon black grind phase. Each of the ingredients of the carbon-black grind phase is described above with respect to embodiments of the water-based conductive ink composition itself. The ingredients may be added to the first vessel in any desired order and by any desired method, optionally involving a suitable apparatus.

The first vessel may be any type of vessel suitable for mixing ink components. Then, the carbon-black grind phase may be ground for a suitable time such as from 30 minutes to 5 hours, or from 1 hour to 2 hours. In some embodiments, the carbon-black grind phase may be ground until at least 90% of the carbon black particles have a particle size less than 10 μm. The grinding of the carbon black may be accomplished, for example, using a grinding medium such as ceramic microspheres. A particularly suitable grinding medium is Zirmil® Y, which contains yttria-stabilized zirconia (93 wt. % $ZrO_2$) beads. Zirmil® Y beads with a nominal average diameter of 1.5 mm may have a distribution of particle sizes from about 1.25 nun to about 1.6 mm. Grinding of the carbon-black grind phase in a paint shaker with 1.5 mm Zirmil® Y, for example, for about 1 hour may yield carbon black particles for which at least 90% of the carbon black particles have a particle size less than 10 µm. If a large amount of carbon-black grind phase is required for a particular ink formulation, multiple batches may be prepared, then blended together using a mixer, such as a Cowles mixer, for a suitable time such as 10 minutes to 30 minutes.

Preparing the second premix may include adding ingredients to a second vessel to form a graphite grind phase. The ingredients may include acid-washed graphite particles, at least one polymeric dispersant, and water. In some embodiments, the graphite grind phase may contain from 5 wt. % to 20 wt. % acid-washed graphite particles, a total of from about 0.1 wt % to about 5 wt. % or from 0.5 wt. % to 2 wt. % polymeric dispersant, and a balance of water such as, for example from about 75 wt. % to about 94.9 wt. % or from 79.5 wt. % to 94.5 wt. % water. Each of the ingredients of the graphite grind phase is described above with respect to embodiments of the water-based conductive ink composition itself. The ingredients may be added to the second vessel in any desired order and by any desired method, optionally involving a suitable apparatus.

The second vessel may be any known vessel suitable for mixing ink components. Then, the graphite grind phase may be ground for a suitable time such as from 30 minutes to 5 hours, or from 1 hour to 2 hours. In some embodiments, the graphite grind phase may be ground until at least 90% of the acid-washed graphite particles have a particle size less than 10 µm. The grinding of the graphite may be accomplished, for example, using a grinding medium such as ceramic microspheres. A particularly suitable grinding medium is Zirmil® Y, which contains yttria-stabilized zirconia (93 wt. % $ZrO_2$) beads. Grinding of the graphite grind phase in a paint shaker with 1.5 mm Zirmil® Y, for example, for about 1 hour may yield acid-washed graphite particles for which at least 90% of the acid-washed graphite particles have a particle size less than 10 µm.

Once the first premix (the carbon-black grind phase) and the second premix (the graphite grind phase) are formed, at least a portion of the first premix and at least a portion of the second premix may be mixed together in a third vessel to form a letdown phase, which after the mixing becomes the final water-based conductive ink composition. The third vessel may be the first vessel, the second vessel, or a separate vessel also suitable for mixing ink components therein. The letdown phase may be mixed with any suitable mixing apparatus. An illustrative example of a suitable mixing apparatus may include a Cowles mixer, with which the letdown phase may be stirred for a suitable amount of time such as, for example, 10 hours to 24 hours at a suitable speed such as, for example, 10 rpm to 30 rpm.

In some embodiments, the letdown phase may be prepared in the third vessel, or in another suitable vessel and transferred to the third vessel, before the mixing in the third vessel. The letdown phase may be prepared by combining the portion of the carbon black grind phase, the portion of the graphite grind phase, acrylic binder in addition to any present in either of the grind phases, polyvinylpyrrolidone binder in addition to any present in either of the grind phases, and water in addition to the water present in both of the grind phases. In an illustrative embodiment, the grind phase may contain, for example, from about 40 wt. % to about 60 wt. % of the carbon black grind phase, from about 0.5 wt. % to about 5 wt. % of the graphite grind phase, from about 1 wt. % to about 5 wt. % of at least one acrylic binder added to the letdown phase in addition to any acrylic binder already present in the carbon black grind phase, from about 1 wt. % to about 5 wt. % of at least one polyvinylpyrrolidone binder added to the letdown phase in addition to any polyvinylpyrrolidone binder already present in the carbon black grind phase, and from about 25 wt. % to about 57.5 wt. % water added to the letdown phase in addition to the water already present in the carbon black grind phase and the graphite grind phase.

After the letdown phase is mixed, the water-based conductive ink composition is formed. An illustrative embodiment of a water-based conductive ink composition that may be formed from the letdown phase described above, when the letdown phase is prepared according to the methods described above, may include from about 0.03 wt. % to about 1.0 wt. % acid-washed graphite particles; from about 0.40 wt. % to about 6.0 wt. % of the carbon black particles; from about 0.02 wt. % to about 0.45 wt. % polymeric dispersant; from about 1.0 wt. % to about 8.0 wt. % acrylic binder; from about 1.0 wt. % to about 8.0 wt. % polyvinylpyrrolidone binder; from about 0.04 wt. % to about 1.5 wt. % defoamer; and from about 75.05 wt. % to about 97.43 wt. % of the aqueous carrier, based on the total weight of the water-based conductive ink composition. The total elemental contaminant level of such water-based conductive ink compositions may be less than 100 ppm, less than 50 ppm, or less than 10 ppm, based on the total weight of the composition.

The above described embodiments of methods for preparing the water-based conductive ink composition may further include washing graphite particles to form the acid-washed graphite particles. The washing of the graphite particles preferably occurs before the graphite particles are used to form the graphite grind phase. However, it is contemplated that the graphite particles could be washed after being ground until at least 90% of the graphite particles have a particle size less than 10 µm. The washing of the graphite particles may include saturating the graphite particles in an acid to form a washing solution, agitating the washing solution containing the graphite particles, filtering the graphite particles from the washing solution, then drying the filtered graphite particles to form the acid-washed graphite particles.

To saturate the graphite particles, as-received graphite may be placed in a suitable acid-compatible vessel, and acid may be added to the vessel at least until the acid covers the graphite particles. In one embodiment, the acid may be added until two or three times as much acid is present by volume in the vessel as graphite particles. The acid may be any acid and may preferably be a strong acid that fully dissociates in water. Suitable strong acids may include, for example, hydrochloric acid, nitric acid, sulfuric acid, and mixtures thereof. Hydrochloric acid may be particularly suitable. Strong acids may be concentrated and/or present in aqueous solution at a concentration of at least 30%. The mixture of the graphite particles and the acid form a washing solution.

The washing solution may be agitated by any suitable laboratory device including, but not limited to, a mechanical stir bar, a mixer, or a sonicator. Sonication is preferred, because it is believed the amplitude of vibration of the washing solution forces the acid into and out of the microscopic pores of the graphite. If a mechanical mixer is used, the agitation should occur using the most vigorous setting of the mixer. The agitation should occur over a long period of time such as at least 10 hours, at least 24 hours, or at least 48 hours.

After the washing solution is agitated, the graphite particles may be filtered from the washing solution using a filter with an appropriate pore size to hold back the graphite particles. The filter may include a Buchner funnel with a frit filter, for example.

In some embodiments, the saturating of the graphite particles, the agitating of the washing solution, and the filtering of the graphite particles may be repeated as many times as necessary for the washing solution remaining after the filtering to have a pH of less than or equal to 5. The three steps may be repeated as needed or, for example, once, twice, five times, ten times, or even twenty times.

The filtered graphite particles then may be dried to form the acid-washed graphite particles to be used as an ingredient in the above-described method for preparing the water-based conductive ink composition. In one embodiment, the graphite particles may be dried by placing them on a dish, such as a silicon carbide dish, and placing the dish in a heated vessel, such as a retort furnace, for a suitable length of time. The drying may be conducted in an inert atmosphere such as nitrogen at standard pressure. An illustrative embodiment of drying the graphite particles includes drying in a retort furnace filled with nitrogen for 30 minutes to 5 hours, or up to 48 hours, during which a set-point temperature of about 150° C. is reached by increasing the temperature from room temperature to the 150° C. at a rate of 10° C./min.

Though only acid-washed graphite has been described, it is contemplated that also the carbon black component of the water-based conductive ink composition may be washed before it is added to the first vessel.

Water-based conductive ink compositions formed according to one or more embodiments of the methods described above may have a total elemental contaminant level of less than 100 ppm by weight, based on the total weight of the water-based conductive ink composition. As defined above, the total elemental contaminant level is the total concentration of aluminum, calcium, cobalt, chromium, copper, iron, potassium, manganese, magnesium, nickel, and zinc in the water-based conductive ink composition.

The water-based conductive ink compositions described herein are contemplated for uses in various technical fields and for applications to various substrates by various methods. As non-limiting examples, the water-based conductive ink compositions described herein may be amenable to application by ink-jet printing, screen printing, dipping, brushing, stenciling or spin-coating onto a flexible substrate or a rigid substrate. The water-based conductive ink compositions described herein may be useful, for example, as primers on a molded part such as an automotive part. During molding, for example, conductive coatings of the water-based conductive ink compositions described herein may allow direct electrostatic over-coating at lower energies, thereby reducing corona effects and providing uniform coverage. The conductive coatings also may be sufficiently electrically conductive to be used in combination with sacrificial anode materials on an exposed surface of a metal or molded plastic part to help prevent corrosion. When applied to plastic substrates, the conductive coatings may exhibit good mechanical adhesion and may permit metals to be plated directly onto a plastic. The water-based conductive ink compositions described herein may also be suitable for printing intricate circuitry patterns demanded by the electronics industry in high performance applications such as, for example, in the preparation of touch pad circuitry. The water-based conductive ink compositions described herein may also be suitable for printing resistors, field emission electrodes, fuel cell catalysts, conductive paper, conductive fabrics, and conductive membranes.

EXAMPLES

The embodiments described above will be better understood by reference to the following examples, which are offered by way of illustration and which one skilled in the art should recognize are not meant to be limiting.

As example water-based conductive ink composition according to one or more embodiments described above was prepared. Samples of graphite and carbon black received from their respective suppliers were washed according to the procedure described below in hydrochloric acid (HCl), supplied by Fisher Scientific as an aqueous solution of 32-38% HCl. The graphite was 4827 graphite, supplied by Asbury Carbons as a dry powder with an average particle size of approximately 5 μm. The carbon black was Vulcan XC 72R, supplied by Cabot Corporation as a dry powder having an average particle size of 3 μm within the 90th percentile. The elemental contaminant levels in the as-received graphite were determined using standard analytical procedures by inductively-coupled plasma connected to a mass spectrometer (ICP-MS analysis).

To remove the elemental contaminants from the graphite, the graphite is saturated with the HCl to form a runny mixture. The runny mixture is agitated in an ultrasonic bath for about 24 hours to allow the HCl to fully infiltrate into the pores of the graphite. After the 24 hours, the mixture is filtered using a glass funnel with a frit filter (BUCHNER 10-15 μm). The agitation and filtering steps are repeated multiple times until a pH of 5 or less is attained from the acid solution remaining after filtering off the graphite. Once a pH of 5 is attained for the mixture, the graphite is placed into a silicon carbide dish and dried in a retort furnace in a nitrogen ($N_2$) atmosphere at 150° C., reached with a ramp rate of 10° C./min. Elemental contaminant levels of graphite prepared in this manner from the as-received samples noted above were determined by ICP-MS analysis. The results from the ICP-MS analyses of the as-received graphite and of the HCl-washed graphite are summarized in Table 1.

TABLE 1

Elemental Contaminant Levels in As-Received Graphite and HCl-washed Graphite.

| Elemental Contaminant | Graphite[1] | |
|---|---|---|
| | As-received* | HCl-washed* |
| Aluminum | 80.0 | 12.0 |
| Calcium | 88.0 | 2.0 |
| Cobalt | 0.7 | 0.4 |
| Chromium | 4.7 | 0.9 |
| Copper | 2.8 | 2.0 |
| Iron | 2780 | 7.0 |
| Potassium | 11.1 | 6.0 |
| Manganese | 8.0 | 0.3 |
| Magnesium | 7.4 | 5.6 |
| Nickel | 22.0 | 20.0 |
| Zinc | 1.3 | 0.4 |
| TOTAL | 3006 | 56.6 |

[1]4827 graphite, supplied by Asbury Carbons as a dry powder with an average particle size of approximately 5 μm As shown in Table 1, the washing of the graphite in the HCl lowered the total elemental contaminant level from 3006 ppm to 56.6 ppm, representing the elimination of nearly 98% of the elemental contaminants present in the as-received graphite. The HCl washing of the graphite resulted in decreases in the levels of each of the elements analyzed. The most notable decrease was that of the iron concentration from 2780 ppm to 7.0 ppm.

To form the example water-based conductive ink composition, separate grind phases of graphite and of carbon black were prepared pre-mixes. The pre-mixes were prepared with higher weight percentages of solids than intended for the final ink composition to ensure good dispersion and the correct percentage of solids of the final composition were obtained.

To prepare the carbon-black grind phase (hereafter "Phase 1"), the ingredients and respective amounts listed in Table 2 were added to a Red Devil® Model 1400 paint shaker and were ground for 1 hour using Zirmil®-Y, a grinding medium comprising balls of 93 wt. % $ZrO_2$ and about 5 wt. % $Y_2O_3$ with average diameters of 1.5 mm and sizes ranging from about 1.25 mm to about 1.6 mm, supplied by Glen Mills, Inc. Unless noted otherwise, all weight % values are based on the amount of ingredient added, not the amount of reported active polymer in the case of ingredients that contain less than 100 wt. % actives in an aqueous solution.

TABLE 2

Ingredients of Carbon-Black Grind Phase (Phase 1)

| Ingredient | Amount Added (g) | Weight % of Phase 1 |
|---|---|---|
| Carbon black[1] | 23.34 | 5.00% |
| Solsperse ® 46000[2] | 1.40 | 0.30% |
| Joncryl ® 2660[3] | 7.47 | 1.60% |
| Joncryl ® 624[4] | 7.47 | 1.60% |
| Luvitec ® PVP K30[5] | 7.47 | 1.60% |
| Luvitec ® PVP K90[6] | 7.47 | 1.60% |
| 1-Butanol[7] | 8.23 | 1.76% |
| Water[8] | 403.80 | 86.53% |
| TOTAL | 466.65 | 100.00% |

[1]Vulcan XC 72R, supplied by Cabot Corporation as a dry powder having an average particle size of 3 μm within the 90th percentile, washed in HCl
[2]Polymeric dispersant free of anionic polyelectrolytes, supplied as aqueous solution (50 wt. % actives) by Lubrizol
[3]Binder comprising 40.0-50.0 wt. % ammonium salts of modified acrylic copolymers and 0.1-1.0% ammonium hydroxide in aqueous dispersion and having a viscosity of about 1100 cps, supplied by BASF
[4]Binder comprising 40.0-50.0 wt. % ammonium salts of modified acrylic copolymers in aqueous dispersion and having a viscosity of about 900 cps, supplied by BASF
[5]Aqueous solution comprising 20.0-40.0 wt. % polyvinylpyrrolidones having an average molecular weight of about 60,000 Da, supplied by International Specialty Products
[6]Aqueous solution comprising 19.0-21.0 wt. % polyvinylpyrrolidones having an average molecular weight of about $1.2 \times 10^6$ Da, supplied by International Specialty Products
[7]Defoamer, supplied as 99.8% anhydrous colorless liquid by Fisher Scientific
[8]Unless otherwise noted, all water used to prepare the inventive examples was deionized water having a resistance of at least 16 MΩ and is in addition to any water present in the other ingredients as-received.

The elemental contaminant levels of the ingredients used to prepare the Phase 1 described above were determined by ICP-MS analysis, as summarized in Table 3. The measurements summarized in Table 3 demonstrate that contribution of elemental contaminants from the additional ingredients such as the binders, the dispersants, the defoamer, and the water, were minimal.

TABLE 3

Elemental Contaminant Levels in Grind-Phase Ingredients, Measured by ICP-MS Analysis

| | Concentration in Ingredient (ppm) | | | | | | | |
|---|---|---|---|---|---|---|---|---|
| Elemental Contaminant | PVP K30 | PVP K90 | Solsperse 46000 | Joncryl 2660 | Joncryl 624 | Butanol | Water | TOTAL |
| Aluminum | 2.0 | 2.0 | 0.5 | 6.0 | 2.0 | 0.1 | 4.0 | 16.6 |
| Calcium | 4.0 | 3.0 | 0.1 | 16.0 | 17.0 | 0.5 | 11.0 | 51.6 |
| Cobalt | 1.0 | 1.0 | — | 0.1 | 0.1 | — | — | 2.2 |
| Chromium | 1.0 | 1.0 | — | 0.2 | 0.2 | — | — | 2.4 |
| Copper | 1.0 | 1.0 | — | 0.1 | 0.1 | — | 1.0 | 3.2 |
| Iron | 2.0 | 2.0 | 2.0 | 2.0 | 2.0 | 0.1 | 1.0 | 11.1 |
| Potassium | 10.0 | 10.0 | — | 4.0 | 10.0 | 0.1 | 1.0 | 35.1 |
| Manganese | 1.0 | 1.0 | 0.1 | 0.1 | 0.1 | — | — | 2.3 |
| Magnesium | 2.0 | 2.0 | — | 3.0 | 2.0 | 1.0 | 1.0 | 11.0 |
| Nickel | 1.0 | 1.0 | — | 0.1 | 0.1 | — | — | 2.2 |
| Zinc | 1.0 | 1.0 | — | 0.1 | 0.1 | — | 1.0 | 3.2 |
| TOTAL | 26.0 | 25.0 | 2.7 | 31.7 | 33.7 | 2.8 | 20.0 | 141.9 |

Additionally, elemental contaminant levels of two carbon-black grind phases prepared using different mixing media were compared with the Phase 1, prepared as described above using Zirmil®-Y beads. In a first comparative example, the mixing medium was YTZ, 1-mm balls comprising about 95 wt. % $ZrO_2$ and about 5 wt. % $Y_2O_3$ with a density of 6 g/cm³, supplied by Tosoh Corporation. In a second comparative example, the mixing medium was agate balls, made from a quartz mineral with a Mohs hardness of about 7 and a diameter of about 5 mm, supplied by SPI Supplies. Comparisons with regard to the elemental contamination of carbon-black phases prepared using the different mixing media are provided in Table 4.

TABLE 4

Selected metal contaminants in carbon-black grind phases prepared using various mixing media

| | Concentration in carbon-black grind phase (ppm) | | |
|---|---|---|---|
| Contaminant | Zirmil-Y | YTZ | Agate Balls |
| Aluminum | 5.0 | 69.0 | 76.0 |
| Calcium | 3.0 | 220.0 | 78.0 |
| Iron | 5.0 | 790.0 | 679.0 |
| Sodium | 13.0 | 750.0 | 739.0 |
| Magnesium | 2.0 | 59.0 | 34.0 |
| TOTAL | 28.0 | 1888.0 | 1606.0 |

As shown in Table 4, it was observed from an ICP-MS analysis that, after 24 hours of mixing, both the Zirmil®-Y beads themselves and the residual solution of distilled water in which the Zirmil®-Y beads had been used showed no significant amounts of elemental contaminants. As such, no additional purification steps or purification equipment were necessitated from contaminants introduced through the grinding medium. Multiple batches of the Phase 1 were prepared according to the above procedure and were subsequently blended using a Cowles mixer for 20 minutes.

To prepare the graphite grind phase (hereafter "Phase 2"), the ingredients and respective amounts listed in Table 5 were added to a Red Devil® Model 1400 paint shaker and were ground for 1 hour using the Zirmil®-Y beads.

TABLE 5

Ingredients in Each Batch of Graphite Grind Phase (Phase 2)

| Ingredient | Amount Added (g) | Weight % of Phase 2 |
|---|---|---|
| HCl-washed graphite | 30.00 | 10.00% |
| Solsperse ® 46000 | 3.00 | 1.00% |
| Water | 267.00 | 89.00% |
| TOTAL | 300.00 | 100.00% |

After the grinding steps, the Phase 1 and the Phase 2 had particle size distributions such that at least 90 wt. % of the particles present in each phase had particle sizes of less than 10 μm. Thereupon, a letdown phase was implemented, during which predetermined portions of the Phase 1 mixture, the Phase 2 mixture, and additional binders were added so as to provide suitable physical and electrical properties to the final water-based conductive ink composition. The ingredients and respective amounts added to form the final letdown phase mixture (hereafter "Phase 3") are provided in Table 6.

TABLE 6

Ingredients of Final Let-Down Phase (Phase 3) to Form Water-Based Conductive Ink Composition

| Ingredient | Amount Added (g) | Weight % of Phase 3 |
|---|---|---|
| Phase 1 (carbon black grind phase) | 536.00 | 53.60% |
| Phase 2 (graphite grind phase) | 18.67 | 1.87% |
| Joncryl ® 2660 | 16.82 | 1.68% |
| Joncryl ® 624 | 16.82 | 1.68% |
| Luvitec ® PVP K30 | 16.82 | 1.68% |
| Luvitec ® PVP K90 | 16.82 | 1.68% |
| Water | 378.00 | 37.80% |
| TOTAL | 999.95 | 100.00% |

The Phase 3 mixture was mixed at 20 rpm for 16 hours using a 2-inch (5-cm) diameter Cowles mixer. Thus, the final water-based conductive ink composition, as a whole, contained ingredients derived from one of Phase 1, Phase 2, or Phase 3. The full list of ingredients is summarized below in Table 7.

TABLE 7

Ingredients of Water-Based Conductive Ink Composition, Arranged According to Source During Preparation

| Ingredient | Amount Added (g) by Source | | | | Weight % of Composition |
|---|---|---|---|---|---|
| | Phase 1 | Phase 2 | Phase 3 | Total (g) | |
| Carbon black | 26.81 | 0.00 | 0.00 | 26.81 | 2.68% |
| HCl-washed graphite | 0.00 | 1.87 | 0.00 | 1.87 | 0.19% |
| Solsperse ® 46000 | 1.61 | 0.19 | 0.00 | 1.79 | 0.18% |
| Joncryl ® 2660 | 8.58 | 0.00 | 16.82 | 25.40 | 2.54% |
| Joncryl ® 624 | 8.58 | 0.00 | 16.82 | 25.40 | 2.54% |
| Luvitec ® PVP K30 | 8.58 | 0.00 | 16.82 | 25.40 | 2.54% |
| Luvitec ® PVP K90 | 8.58 | 0.00 | 16.82 | 25.40 | 2.54% |
| 1-Butanol | 9.45 | 0.00 | 0.00 | 9.45 | 0.95% |
| Water | 463.81 | 16.62 | 378.00 | 858.43 | 85.85% |
| TOTAL | 536.00 | 18.67 | 445.28 | 999.95 | 100.00% |

It should be understood that the weight % data provided in the tables above are based on an amount of ingredient added to the composition, notwithstanding that a portion of the ingredients are solid (actives) and a portion are liquid (typically water). The example composition summarized in Table 7 may also be described according to solid, active components. Namely, the composition of Table 7 comprises by weight, based on the total weight of the composition: 2.68% carbon black particles; 0.19% HCl-washed graphite particles; about 0.09% polymeric dispersant (based on about 50% actives in Solsperse 46000); about 1.68% acrylic binders (based on 50% actives in both Joncryl® 2660 and Joncryl® 624); about 0.84% polyvinylpyrrolidone binders (based on 25% actives in both Luvitec® PVP K30 and Luvitec® PVP K90); 0.95% defoamer (based on 1-butanol); and a balance of water to 100%.

Physical and electrical properties of the example water-based conductive ink composition are provided below in Table 8. The properties of the inventive example composition are compared against those of a non-inventive comparative composition, namely DAG EB-012, a commercially available conductive ink. The properties of the inventive example composition are compared also against those of a supernatant mixture of 60 wt. % DAG EB-012 and 40 wt. % distilled water. The supernatant mixture is added as a basis for comparison because its viscosity at a shear rate of 100 s$^{-1}$ is similar to that of the inventive composition. It was observed, however, that the DAG EB-012 supernatant exhibited substantial shear-thinning, evidenced by its change in viscosity from 33.20 cps at a shear rate of 1 s$^{-1}$ to 7.86 cps at a shear rate of 100 s$^{-1}$. In contrast, the inventive composition at shear rates of 1 s$^{-1}$ and 100 s$^{-1}$ were remarkably similar, indicating that the inventive composition may have substantially increased stability.

TABLE 8

Properties of Example Water-Based Conductive Ink Composition

| Property | | Example Composition | Comparative Composition[1] | Comparative Composition[2] |
|---|---|---|---|---|
| Particle Size Distribution | 10% less than (μm) | 0.38 | 1.89 | 0.25 |
| | 50% less than (μm) | 1.43 | 23.66 | 1.04 |
| | 90% less than (μm) | 7.33 | 72.50 | 8.16 |
| pH | | 8.40 | 7.79 | 7.85 |
| Viscosity (cps at 25° C.) | at 1 s$^{-1}$ | 7.11 | 406.00 | 33.20 |
| | at 100 s$^{-1}$ | 4.99 | 80.40 | 7.86 |
| | at 1000 s$^{-1}$ | 6.44 | 45.40 | 7.28 |
| Weight % solids at 110° C. | | 10.00 | 20.00 | 14.00 |
| Dry thickness (μm at 25° C.) | | 0.75 | 0.75 | 0.75 |
| In-plane resistance (Ω) | | 50.00 | 50.00 | 50.00 |
| Thru-plane resistance (Ω · cm$^2$) | | 0.01 | 0.01 | 0.01 |

[1]DAG EB-012, as received from Acheson Colloids Company, comprising by weight 10-30% polyvinylpyrrolidone, 10-30% graphite, 1-5% carbon black, 10-30% proprietary ingredients, and 30-60% water.
[2]DAG EB-012 supernatant, 60 parts by weight as-received DAG EB-012 diluted with 40 parts by weight water to adjust the viscosity of the as-received formulation at a shear rate of 100 s$^{-1}$ to a value similar to the corresponding viscosity of the inventive example composition The elemental contaminant levels of the example water-based conductive ink composition were determined by ICP-MS analysis after digesting the ink composition in hydrochloric acid. The ICP-MS analysis data are shown in Table 9 The contaminant levels of the inventive example composition are compared with those of DAG EB-012, both as-received from the supplier, and in a 60:40 dilution in water. The 60:40 dilution of DAG EB-012 may be performed to adjust the viscosity of the DAG EB-012 to a level suitable for depositing conductive traces by slot coating. It is noted that, owing at least in part to the larger particle sizes in the particle size distribution, the 60:40 dilution of DAG EB-012 is prone to settling and is typically viable for only 2-3 hours before settling occurs and a new composition must be prepared. The dispersion of conductive particles in the inventive example composition, on the other hand, remains viable for slot-coating applications for at least two weeks to three weeks.

TABLE 9

Elemental Contaminant Levels in Example Water-Based Conductive Ink Composition, as determined by ICP-MS analysis

| Elemental Contaminant | Example Composition (ppm) | Comparative Composition[1] (ppm) | Comparative Composition[2] (ppm) |
|---|---|---|---|
| Aluminum | 3.0 | 68.0 | 4.0 |
| Calcium | 2.0 | 7.0 | 23.0 |
| Cobalt | 0.1 | 0.1 | 2.4 |
| Chromium | 0.2 | 0.5 | 0.2 |
| Copper | 0.1 | 0.1 | 0.1 |
| Iron | 2.0 | 120 | 76.0 |
| Potassium | 1.0 | 4 | 5.0 |
| Manganese | 0.1 | 0.2 | 0.2 |
| Magnesium | 0.5 | 0.2 | 1.1 |
| Nickel | 0.4 | 1.7 | 0.4 |
| Zinc | 0.7 | 0.2 | 0.1 |
| TOTAL | 10.1 | 202.0 | 112.5 |

[1]DAG EB-012, as received from Acheson Colloids
[2]DAG EB-012 supernatant, described above As shown by the contaminant levels of the eleven elements analyzed in Table 9, the total elemental contaminant level of the water-based conductive ink composition was well below 20 ppm, compared to the DAG EB-012 ink with total elemental contaminant levels of 202.0 ppm as-received and 112.5 ppm in the 60:40 dilution. As such, it is believed that compositions prepared by the above method are well suited for use in ultracapacitor applications requiring low amounts of elemental contaminants so as to avoid Faradic reactions on electrodes of the ultracapacitors.

To test coating effectiveness of the example water-based conductive ink composition prepared and characterized as above, the final composition was applied to an aluminum-foil current collector using a slot-coater. Coatings having target nominal wet thickness of 21 μm and target nominal dry thickness of 0.75 μm were deposited. The term "nominal" denotes an equivalent thickness that would be reached if either the graphite or carbon black were a solid film having no pores and covering the same area as the deposited coating. The targeted nominal thickness values were achieved with the slot coater by setting a flow rate of 21 mL/min; a coating width (equivalent to the width of the slot-coater shim) of 4 inches (10.2 cm); a slot height (equivalent to the width of the opening of the slot-coater shim) of 0.005 inches (0.13 mm); a length of lands of lips of 0.015 inches (0.38 mm); a coating gap of 0.0075 inches (0.19 mm); a wet-film coating thickness of 21 μm; and a coating speed of 36 feet/second (11 m/min; 0.18 m/s). Once the water-based conductive ink composition is coated on both sides of the current collector, the current collector is heated at 113-115° C. for about 2 minutes. The print quality of the example composition was found by optical microscopy to be good, as no agglomerates of particles were observed. The coatings were found to be scuff-resistant and scratch-resistant. The resistivity of the water-based conductive ink compositions and its ability to adhere to the current collector were found not deteriorate with creasing or bending of the current collector.

Thus, it has been shown that water-based conductive ink compositions can be made that are suitable for use in applications requiring low levels of elemental contaminants. The water-based conductive ink compositions are environmentally friendly, particularly when water as the only carrier. Particularly remarkably, even when devoid of alkylene glycols, such as ethylene glycol and propylene glycol, the water-based conductive ink compositions described herein remain stable, without settling of conductive carbon particles, for long periods such as from 2 weeks to 3 weeks.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

What is claimed is:

1. A water-based conductive ink composition comprising:
   an aqueous carrier;
   acid-washed graphite particles;
   carbon black particles; and
   at least one stabilizing ingredient that suspends the acid-washed graphite particles and the carbon black particles in the aqueous carrier, the at least one stabilizing ingredient being selected from the group consisting of dispersants, binders, defoamers, and combinations thereof,
   wherein:
   the water-based conductive ink composition has a total elemental contaminant level of less than 100 ppm, based on the total weight of the water-based conductive ink composition;
   the total elemental contaminant level is the total concentration of aluminum, calcium, cobalt, chromium, copper, iron, potassium, manganese, magnesium, nickel, and zinc in the water-based conductive ink composition; and
   at least 90 wt. % of the acid-washed graphite particles and the carbon black particles, based on the combined weight of the acid-washed graphite particles and the carbon black particles, have particle sizes less than 10 μm.

2. The water-based conductive ink composition of claim 1, wherein the total elemental contaminant level is less than 20 ppm.

3. The water-based conductive ink composition of claim 1, having an iron concentration of less than 50 ppm, based on the total weight of the water-based conductive ink composition.

4. The water-based conductive ink composition of claim 1, wherein the aqueous carrier consists essentially of water.

5. The water-based conductive ink composition of claim 1, wherein the water-based conductive ink composition is devoid of alkylene glycols.

6. The water-based conductive ink composition of claim 1, wherein all components of the water-based conductive ink composition are chemically compatible with acetonitrile.

7. The water-based conductive ink composition of claim 1, wherein the at least one stabilizing ingredient comprises:
   at least one polymeric dispersant;
   at least one acrylic binder;
   at least one polyvinylpyrrolidone binder; and
   at least one defoamer.

8. The water-based conductive ink composition of claim 7, comprising:
   from about 0.03 wt. % to about 1.0 wt. % of the acid-washed graphite particles;
   from about 0.40 wt. % to about 6.0 wt. % of the carbon black particles;
   from about 0.02 wt. % to about 0.45 wt. % polymeric dispersant;
   from about 1.0 wt. % to about 8.0 wt. % acrylic binder;
   from about 1.0 wt. % to about 8.0 wt. % polyvinylpyrrolidone binder;
   from about 0.04 wt. % to about 1.5 wt. % defoamer; and
   from about 75.05 wt. % to about 97.43 wt. % of the aqueous carrier, based on the total weight of the water-based conductive ink composition, wherein the water-based conductive ink composition is devoid of organic solvents, water-soluble organic co-solvents, and alkylene glycols.

9. The water-based conductive ink composition of claim 5, wherein the at least one polyvinylpyrrolidone binder comprises first polyvinylpyrrolidones with average molecular weights of from 40,000 Da to 80,000 Da and second polyvinylpyrrolidones with average molecular weights of from $1.0\times 10^6$ Da to $1.5\times 10^6$ Da.

10. The water-based conductive ink composition of claim 1, wherein the water-based conductive ink composition has viscosities of from about 5 cps to about 25 cps at a shear rate of $1\ s^{-1}$ and from about 3 cps to about 10 cps at a shear rate of $100\ s^{-1}$.

11. A method for preparing a water-based conductive ink composition, the method comprising:
   adding to a first vessel carbon black particles, at least one polymeric dispersant, at least one acrylic binder, at least one polyvinylpyrrolidone binder, at least one defoamer, and water to form a carbon-black grind phase;
   grinding the carbon-black grind phase;
   adding to a second vessel acid-washed graphite particles, at least one polymeric dispersant, and water to form a graphite grind phase;
   grinding the graphite grind phase; and
   mixing in a third vessel at least a portion of the carbon-black grind phase and at least a portion of the graphite grind phase to form the conductive ink composition,
   wherein:
   the conductive ink composition has a total elemental contaminant level of less than 100 ppm by weight, based on the total weight of the water-based conductive ink composition; and
   the total elemental contaminant level is the total concentration of aluminum, calcium, cobalt, chromium, copper, iron, potassium, manganese, magnesium, nickel, and zinc in the water-based conductive ink composition.

12. The method of claim 11, further comprising washing graphite particles in an acid to form the acid-washed graphite particles.

13. The method of claim 12, wherein the acid is selected from the group consisting of hydrochloric acid, sulfuric acid, nitric acid, and mixtures thereof.

14. The method of claim 12, wherein the washing of the graphite particles comprises:
   saturating the graphite particles in the acid to form a washing solution;
   agitating the washing solution containing the graphite particles;
   filtering the graphite particles from the washing solution; and
   drying the filtered graphite particles to form the acid-washed graphite particles.

15. The method of claim 14, further comprising repeating the saturating, agitating, and filtering until the washing solution has a pH of less than 5 after the graphite particles are filtered from the washing solution.

16. The method of claim 11, wherein:
   the grinding of the carbon-black grind phase comprises grinding until at least 90% of the carbon black particles have a particle size less than 10 μm; and
   the grinding of the graphite grind phase comprises grinding until at least 90% of the graphite particles have a particle size less than 10 μm.

17. The method of claim 11, wherein the carbon black grind phase comprises:
   from about 1 wt. % to about 10 wt. % of the carbon black particles;
   from about 0.05 wt. % to about 0.5 wt. % polymeric dispersant;
   from about 0.1 wt. % to about 5 wt. % acrylic binder;
   from about 0.1 wt. % to about 5 wt. % polyvinylpyrrolidone binder;
   from about 0.1 wt. % to about 2.5 wt. % defoamer; and
   from about 77 wt. % to about 98.65 wt. % water, based on the total weight of the carbon black grind phase.

18. The method of claim 11, wherein the graphite grind phase comprises:
   from about 5 wt. % to about 20 wt. % of the acid-washed graphite particles;
   from about 0.1 wt. % to about 3 wt. % polymeric dispersant; and
   from about 77 wt. % to about 94.9 wt. % water, based on the total weight of the graphite grind phase.

19. The method of claim 11, further comprising preparing a letdown phase in the third vessel before the mixing in the third vessel, the letdown phase comprising, based on the total weight of the letdown phase:
   from about 40 wt. % to about 60 wt. % of the carbon black grind phase,
   from about 0.5 wt. % to about 5 wt. % of the graphite grind phase,
   from about 1 wt. % to about 5 wt. % of at least one acrylic binder added to the letdown phase in addition to any acrylic binder already present in the carbon black grind phase;
   from about 1 wt. % to about 5 wt. % of at least one polyvinylpyrrolidone binder added to the letdown phase in addition to any polyvinylpyrrolidone binder already present in the carbon black grind phase; and
   from about 25 wt. % to about 57.5 wt. % water added to the letdown phase in addition to the water already present in the carbon black grind phase and the graphite grind phase.

20. The method of claim 11, wherein the water-based conductive ink composition comprises:
   from about 0.03 wt. % to about 1.0 wt. % of the acid-washed graphite particles;
   from about 0.40 wt. % to about 6.0 wt. % of the carbon black particles;

from about 0.02 wt. % to about 0.45 wt. % polymeric dispersant;
from about 1.0 wt. % to about 8.0 wt. % acrylic binder;
from about 1.0 wt. % to about 8.0 wt. % polyvinylpyrrolidone binder;
from about 0.04 wt. % to about 1.5 wt. % defoamer; and
from about 75.05 wt. % to about 97.43 wt. % of the aqueous carrier, based on the total weight of the water-based conductive ink composition, wherein the water-based conductive ink composition is devoid of organic solvents, water-soluble organic co-solvents, and alkylene glycols.

21. The method of claim 20, wherein the total elemental contaminant level is less than 20 ppm.

* * * * *